United States Patent
Ferlin

(10) Patent No.: US 8,720,467 B2
(45) Date of Patent: May 13, 2014

(54) PURGING DEVICE FOR ASSEMBLED UNIT AND METHOD OF DEFLATING AN ASSEMBLED UNIT

(75) Inventor: Olivier Ferlin, Malauzat (FR)

(73) Assignees: Michelin Recherche et Technique S.A., Granges-Paccot (CH); Compagnie Generale des Etablissements Michelin, Clermont-Ferrand (FR)

( * ) Notice: Subject to any disclaimer, the term of this patent is extended or adjusted under 35 U.S.C. 154(b) by 382 days.

(21) Appl. No.: 12/996,628

(22) PCT Filed: Jun. 3, 2009

(86) PCT No.: PCT/EP2009/003944
§ 371 (c)(1),
(2), (4) Date: Feb. 18, 2011

(87) PCT Pub. No.: WO2009/146891
PCT Pub. Date: Dec. 10, 2009

(65) Prior Publication Data
US 2011/0132464 A1 Jun. 9, 2011

(30) Foreign Application Priority Data

Jun. 4, 2008 (FR) ..................................... 08 53697

(51) Int. Cl.
*F16K 31/12* (2006.01)
(52) U.S. Cl.
USPC .......... 137/15.19; 137/224; 137/228; 251/324
(58) Field of Classification Search
USPC ................. 137/224, 228, 229, 861, 885, 869, 137/15.19; 251/63, 63.5, 324
See application file for complete search history.

(56) References Cited

U.S. PATENT DOCUMENTS

| | | | | |
|---|---|---|---|---|
| 1,134,701 A * | 4/1915 | Seeberger | ...................... | 152/415 |
| 1,358,524 A * | 11/1920 | Cooper | ........................ | 152/421 |
| 1,387,991 A * | 8/1921 | Kunke et al. | ................... | 137/224 |
| 3,537,469 A * | 11/1970 | Hagar | ........................... | 137/224 |
| 4,681,148 A * | 7/1987 | Decker et al. | .................. | 152/431 |
| 4,765,385 A * | 8/1988 | McGeachy | .................... | 152/416 |
| 4,794,843 A * | 1/1989 | Poling | ........................... | 137/861 |
| 4,820,166 A * | 4/1989 | Farrell, II | ...................... | 152/415 |
| 6,401,743 B1 * | 6/2002 | Naedler | ........................ | 137/224 |
| 6,923,200 B2 * | 8/2005 | Gonzaga | ........................ | 137/224 |
| 7,117,910 B2 * | 10/2006 | Akahori | ........................ | 152/426 |
| 8,387,671 B2 * | 3/2013 | Durif | ............................ | 152/415 |

FOREIGN PATENT DOCUMENTS

| | | |
|---|---|---|
| CN | 200 942 695 | 9/2007 |
| GB | 2 206 673 | 1/1989 |

* cited by examiner

*Primary Examiner* — Craig Schneider
*Assistant Examiner* — Craig J Price
(74) *Attorney, Agent, or Firm* — Cozen O'Connor

(57) ABSTRACT

A purging device is provided for an assembled unit for a vehicle, having both a wheel including a rim and a tire. The purging device has a body connected to the inflation tube of the assembled unit, the body being designed to be subjected to the inflation pressure of the assembled unit, and a piston able to move inside the body. The piston operates an open/close element, fixed to the piston, between a closed position and a purging position of the body, the open/close element being normally closed, the open/close element and the piston each having a face designed to be exposed to the inflation air inside the body in the closed position. The open/close element is opened by the action of an operating force on the piston. Also disclosed is a method for deflating an assembled unit.

10 Claims, 2 Drawing Sheets

PURGING DEVICE FOR ASSEMBLED UNIT AND METHOD OF DEFLATING AN ASSEMBLED UNIT

RELATED APPLICATIONS

This is a U.S. national stage of application No. PCT/EP2009/003944, filed on Jun. 3, 2009.

This patent application claims the priority of French patent application no. 08/53697 filed Jun. 4, 2008 the disclosure content of which is hereby incorporated by reference.

FIELD OF THE INVENTION

The present invention relates to a purging device for an assembled unit for a vehicle, consisting of both a wheel comprising a rim and a tire, said assembled unit being designed to be fitted to a heavy civil engineering-type vehicle or machine.

Although not limited to this kind of application, the invention will be more particularly described with reference to tires for dumper-type vehicles operating in mines and having an axial width of more than 18 inches.

BACKGROUND OF THE INVENTION

The usual forms of assembled units are of two types as far as the rims are concerned. They are made either with so-called well-base rims, possessing tapering seats inclined relative to the axis of rotation of the unit at an angle of 5° or 15°, or with flat or practically flat-base rims having seats inclined at either 0° or 5° relative to the axis of rotation.

So-called well-base rims comprise a mounting groove whose diameter is significantly less than the nominal diameter of the rim. This internal diameter of the rim can be considered by users to be too small because it does not allow the use for example of brake drums of dimensions suitable for effective braking of the vehicles, which are increasingly powerful for their weight.

As a result, these rims are often used for assembled units intended for passenger and/or heavy vehicles, but are used much less and sometimes not at all for the other types of vehicles, such as for example building site and civil engineering machines.

To make an assembled unit, particularly of "tubeless" type, a flat-base rim requires the presence of at least one detachable lateral ring, a locking ring and a seal, and obviously the presence of the wheel rim having a fixed lip on the opposite side to that where the parts are detachable. The reason for this is that the vehicle wheel dimensions and tire dimensions and in particular the stiffness of the lower regions are such that said wheels must be made in several parts to enable the tire to be mounted on a rim. At least three parts are therefore required. In most cases the number of parts required is more than three and can sometimes be as many as six parts for tires of large dimensions, without counting the parts necessary for mounting the wheels on the vehicle. Except for the rubber seals, the parts of a rim are metallic, and therefore heavy, large, and difficult to handle. It follows that the mounting and removing of large and very large tires are difficult and time-consuming operations. The fitting and/or removal of a wheel equipped with such a tire requires immobilising the vehicle or machine for a not insignificant length of time, which is thus detrimental to the productivity desired when using these vehicles.

Patent Application WO 00/71365 disclosed a technique that simplifies the mounting of tires, which are mounted directly on the hub, the hub thus acting as the rim. Independent mounting rings act as rim seats and are held in place by locking rings which are secured to the hub typically by means of mating profiles. In this technique, the locking ring consists of a cured rubber compound reinforced by and coating a reinforcing ring that is circumferentially elastic and radially resistant to compression.

Such a technique is very promising because it eliminates the stages of mounting on a rim and fixing a wheel to the vehicle, since the tires are mounted directly on the hub by means of the mounting rings and locking rings. Moreover, since the number of components is greatly reduced, maintenance of these components is simplified.

However, whether this latter technique is used or whether the tires are connected to wheels consisting of a plurality of parts, when it comes to changing a tire or switching two tires on the vehicle, either the wheel, or the tire, or both, still have to be removed. This involves deflating the tire, which is essential when changing a tire and practically essential at least in part when switching assembled units in order to reduce their weight.

The deflation time for a 59/80R63 size tire fitted to a dumper-type vehicle is more than 30 minutes. This means that a complete switching of the tires of a vehicle requires a total deflation time of at least two hours.

Given the fact that in a mine a work cycle corresponding to transporting one full skip of a dumper-type vehicle is usually less than this 30-minute period, it is obvious that time spent working on the tires has a direct and substantial influence on the productivity of the vehicles.

There is therefore a desire to reduce the deflation time of such tires.

Tires for civil engineering machines, such as the vehicles used in mines of dumper-type for example, are usually pumped to a pressure of between 4 and 10 bar for ordinary loads and sizes.

Current deflation techniques involve releasing the inner part of the inflation valve to let the air escape. The deflation time could be reduced by increasing the size of current inflation valve systems, but their design would become difficult and the escape of air occasioned by the pressures and volume of air in this type of tire would put the operator, who has to release the inner part of the valve, in danger.

Existing valves of butterfly, plug or open/close element type with suitable dimensions have been envisaged but they have various drawbacks. In the first place, they are too large to be fitted to some vehicles, and secondly the maintenance of these valves requires stripping them completely. Maintenance must be taken into account because when the air escapes from the assembled unit, it carries with it particles such as residues of corrosion from the wheel, fragments of tire, if the latter has suffered deterioration, and liquids resulting from condensation and specific products designed to prevent corrosion.

SUMMARY OF THE INVENTION

One object of the invention is to reduce the time required to deflate large-size tires, especially where the axial width is greater than 18 inches, designed for fitting to dumper-type vehicles where there is a constant drive to increase productivity.

This object has been achieved according to one aspect of the invention with a purging device for an assembled unit for a vehicle, having both of a wheel comprising a rim and a tire, said device comprising a body connected to the inflation tube of the assembled unit, said body being designed to be subjected to the inflation pressure of the assembled unit, and a piston able to move inside the body, said piston operating an open/close element, fixed to the piston, between a closed position and a purging position of the body, said open/close element being normally closed, the open/close element and the piston each having a face designed to be exposed to the inflation air inside the body in the closed position, and the open/close element being opened by the action of an operating force on the piston.

For the purposes of the invention, the assembled unit encompasses any type of tire/wheel assembly, regardless of the type of wheel or rim, and especially assembled units as indicated above and as disclosed in Patent Application WO 00/71365.

According to an embodiment of the invention, the device is mounted on the inflation line and is formed from a body forming a cavity in which a piston is able to move to operate an open/close element. The movement of the open/close element will allow an orifice to be opened so that the assembled unit can be purged. The device thus has a system in which, after inflation, one face of the piston and one face of the open/close element are subjected to the inflation pressure of the assembled unit. If said surfaces of the piston and open/close element are identical, the inflation pressure of the assembled unit has no effect as to the mobility of the piston and open/close element assembly within the body of the purging device. It is possible to make the surface of the piston slightly greater than that of the open/close element so that the inflation pressure determines the closed position of the open/close element. It is also possible to provide a means, such as an elastic or compressible means, to exert a complementary force for example on that surface of the open/close element which is not in contact with the inflation air to ensure that the normal position of the open/close element is the closed position.

The purging device thus defined and more precisely its purging orifice can be sized to reduce the time required to deflate a tire. The reason for this is that since the invention does not adapt a conventional inflation valve for special conditions of deflation by a process corresponding to removing an inner part of a valve, it has been possible to define the device according to the invention which can be opened without any risk to an operator.

In a preferred embodiment of the invention, the operating force applied to the piston is provided by compressed air directed onto that surface of the piston which is not designed to be in contact with the inflation air in the closed position.

The pressure of the air which acts as an operating force can be relatively weak because the movement of the piston and open/close element assembly does not oppose the inflation pressure of the assembled unit.

In the case mentioned earlier, of a surface of the piston slightly greater than that of the open/close element, the force exerted by the compressed air on the surface of the piston that is not in contact with the inflation air must be able to compensate for the force corresponding to the action of the inflation pressure on the surface of the piston equal to the difference between the surfaces of the piston and open/close element. The operating surface, which in this invention is that surface of the piston to which the operating force is applied, being greater than the difference between the surfaces of the piston and of the open/close element, and therefore the pressure of the compressed air that applies the operating force can be selected to be less than that of the inflation pressure of the assembled unit while still allowing the piston of the purging device to be moved in order to open the open/close element.

In the other case mentioned above, of a means such as an elastic or compressible means, that exerts a complementary force on that surface of the open/close element that is not in contact with the inflation air to maintain its closed position, the force applied by the compressed air on that surface of the piston which is not in contact with the inflation air must be able to compensate for the action exerted by said means. Depending on the means adopted, the pressure of the operating air may also be relatively low.

In the other embodiments of the invention, the operating force is provided by any other means known to those skilled in the art such as mechanical or electrical means, e.g. the action of an electromagnet.

In one variant of the invention the purging valve is mounted on the rim base in such a way that the air is discharged into the space axially between the wheels of the vehicle. In such an embodiment the air is discharged into a region that is relatively closed by the underside of the lorry, the ground and the solid parts of the wheels. In the case of twinned wheels, such as on the rear axle of a vehicle, the air can thus be discharged from each of the assembled units into the space between the twinned wheels.

In another variant of the invention, the purging device is remote from the wheel, to which it is connected via a pipe or tube forming part of the inflation line. This variant may be preferred particularly where existing vehicles do not allow for a sufficient passage for the inflation pipe as is necessary when removing wheels to allow the purging device to be connected to the wheel. In this variant the cross section of the tube connecting the purging device to the wheel inflation hole must be at least equal to the cross section of the purging orifice of the device according to the invention.

In a preferred embodiment of the invention described above, in which the compressed air exerts the operating force that opens the purging device, said compressed air may be brought in by a tube to the purging device. It may for example be a rigid tube with one end fixed to the radially inner part of the purging device, to feed said compressed air to the surface of the piston, and with the other end accessible to an operator so that a compressor can be connected up. This other, operator-accessible end, is advantageously located in the space axially outside of the wheels, that is advantageously away from the regions where the air will be discharged. This is to limit deflation-related risks to the operator.

In an advantageous variant of the invention, in its open position the open/close element creates an annular cross section of discharge corresponding to the periphery of said open/close element. In this variant of the invention, for a given total air discharge cross section, the width of the opening is limited and thus prevents the passage of debris contained in the assembled unit of dimensions greater than this width of the opening. This variant of the invention further enhances the safety aspect of deflation by eliminating large-diameter particles that could be entrained during deflation.

In a first embodiment of the invention, the purging device releases the inflation air through an orifice.

The orifice preferably has at least one characteristic dimension that is less than 10 mm. "Characteristic dimension of an orifice" means, for the purposes of the invention, a dimension that characterizes the orifice, such as the diameter in the case of a circular-section orifice, or such as the length, width or height in the case of an orifice of another cross section.

In other embodiments of the invention, the purging device releases the air into the space radially inside the rim through at least two orifices. Having more air outlet orifices can enable further filtering out of debris entrained during deflation because the diameter of the orifices can be reduced as their number increases. Having more orifices can also help to reduce the noise.

In one advantageous embodiment of the invention, the purging device comprises a control system for moving the open/close element to the purging position as soon as the tire pressure exceeds a threshold pressure.

Such an embodiment of the invention provides a control system that will open the purging device beyond a predetermined threshold pressure. Such a system is also advantageously provided with an operator alert because an increase in the pressure must have a cause which it may be preferable to determine.

In a first variant of this embodiment of the invention, in which the purging valve comprises a compressible means determining the normally closed position combined with the open/close element having a cross section greater than that of the piston, said purging device comprises a passive-type control system and the tire pressure keeps the valve open until a pressure defined by the compressible means is reached.

In this variant, the closed state of the open/close element is obtained by a compressible means such as a spring pressing on that face of the open/close element which is not in contact with the inflation air. For this purpose the stiffness of the compressible means compensates for the force due to the combination of the inflation pressure and the difference between the surface area of the open/close element and the surface area of the piston. In accordance with the invention, the stiffness of the compressible means will be defined to provide this compensation and also keep the open/close element closed until an inflation pressure is reached at which the force exerted by the compressible means on the open/close element is greater than the force exerted by said "inflation pressure" on the surface area of the open/close element corresponding to the difference between the surface area of the open/close element and the surface area of the piston. As a consequence, as soon as the inflation pressure exceeds this pressure, referred to as the "threshold pressure", the open/close element opens, closing again as soon as the inflation pressure has dropped back.

In a second variant of this embodiment of the invention, there may be a passive-type control system consisting of a connecting pipe between that surface of the piston which is not normally in contact with the inflation air and the inflation environment subjected to the inflation pressure, which opens as soon as a threshold pressure is reached.

The inventors propose for example connecting a system to this tube such that a diaphragm valve designed to rupture at the predefined pressure threshold and open a passage for the air, through the pipe, from the cavity of the assembled unit to that surface of the piston which is not normally in contact with the inflation air. Such a system is advantageously used on a non-return open/close element to prevent an undesired pressure acting for example on the diaphragm valve when the open/close element is opened by an operating pressure from an operator.

Putting the cavity of the assembled unit in communication with that surface of the piston which is not normally in contact with the inflation air will result in the open/close element opening until the pressure of the assembled unit allows it to close again. In the case of for example a purging device comprising an open/close element and a piston of identical cross section and a compressible means such as a spring determining the closed position of the open/close element, it is the stiffness of the spring that will define the final pressure of the assembled unit once the diaphragm valve is ruptured. This stiffness will be advantageously selected to permit the assembled unit to be driven on and not to require attention at the place where the deflation took place, which is not necessarily suitable for work involving repairing, switching or changing tires.

In a third variant of this embodiment of the invention, said purging device comprises an active-type control system in which, when the pressure of the tire is known, the valve can be kept open by means of an operator command. The operator can tell the inflation pressure of the assembled unit using for example a pressure and/or temperature sensor. For any reason the operator may decide to open the open/close element by applying an operating force to the piston as described above, notably by applying compressed air to that surface of the piston which does not come into contact with the inflation air.

In the case of the third variant, having an active control system, the inventors also propose the use of the tire pressure to act directly on the piston of the purging device and make the open/close element open, but this time with the aid of a system operated by an operator, said system being for example located on a pipe connecting the cavity of the assembled unit to that surface of the piston which is not normally in contact with the air. Operating the purging device and more specifically opening it are in this case similar to the previous case of the passive control system.

In another variant of this embodiment of the invention, in which the purging device comprises a control system for moving the open/close element to the purging position as soon as the pressure of the assembled unit exceeds a threshold pressure, said purging device combines an active-type control system and a passive-type control system. It is then possible to control the pressure of the assembled unit either by a deliberate action, when for example the operator is aware that the pressure is near or above the threshold value, or by an automatic action triggered by a passive-type system.

The purging device thus constructed allows faster deflation, and its diameter and flow rate can be adapted to the requirement defined by the volume of the assembled unit and its inflation pressure, at no risk to the operator.

Moreover, it also allows active and/or passive control systems to be added, which will avoid all risk of operating the tire at excessive pressures and also limit the waiting times which currently exist when excessive pressures occur, notably in order to limit the risks that can lead to tire damage.

Another aspect of the invention is directed to a method of deflating an assembled unit having both a wheel comprising a rim and a tire for a vehicle by means of a purging device comprising a body connected to the inflation tube of the assembled unit, said body being subjected to the inflation pressure of the assembled unit, and a piston able to move inside the body, said piston operating an open/close element, fixed to the piston, between a closed position and a purging position of the body, said open/close element being normally closed, the open/close element and the piston each having a face exposed to the inflation air inside the body in the closed position, and opening of the open/close element being obtained by the action of an operating force on the piston.

BRIEF DESCRIPTION OF THE DRAWINGS

Other details and advantageous features of the invention will become apparent in the course of the following description of illustrative embodiments of the invention, referring to FIGS. 1 to 3, which show.

DETAILED DESCRIPTION OF THE DRAWINGS

For ease of understanding, the figures are not shown to scale.

Figure 1A:
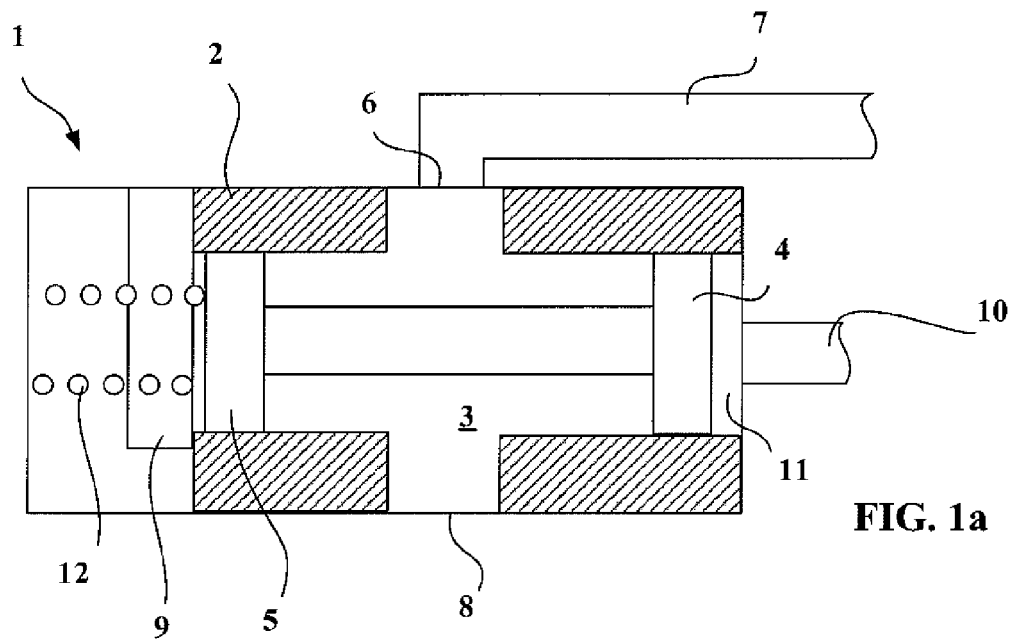
FIG. 1a, 1b a diagrammatic view of a purging valve in a first embodiment of the invention, FIG. 2, a diagrammatic view of a purging valve in a second embodiment of the invention, and FIG. 3, a diagrammatic view of a purging valve in a third embodiment of the invention.
Figure 1B:
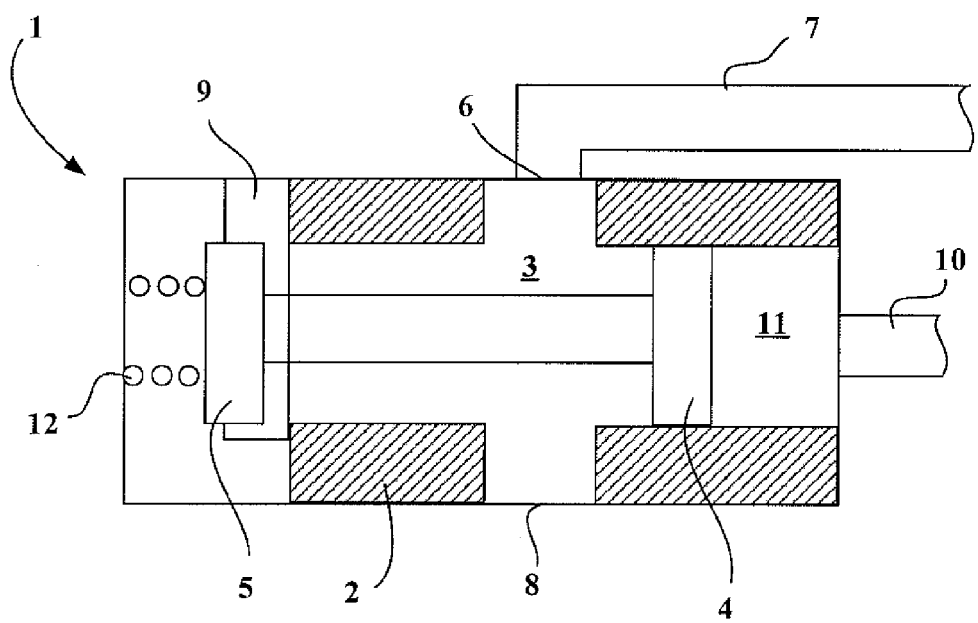

FIGS. 1a and 1b are diagrammatic views in section of a purging device 1 made in accordance with the invention and designed to be connected to the inflation line of an assembled unit. The purging device 1 consists in particular of a body 2 having in particular a cavity 3 in which a piston 4 fixed to an open/close element 5 is able to move.

The various component parts of the purging valve may be made of any material that will allow sufficient dimensional accuracy and rigidity to be achieved. Possible examples are stainless steel, injection-moulded materials, and others.

In the interests of simplification, the figures do not show the seals which are necessary between mutually fixed components and between mutually movable components. The invention requires a high degree of leak resistance, which a person skilled in the art has the knowledge to achieve using O-rings or metallic spring seals in the connections between the wheel and the valve body, and/or between the valve body and the piston, or by using a sloped profile on the piston allowing a metal/metal contact.

Also not shown in the figures are fastening means such as the threaded regions on the various component parts of the purging device.

The cavity 3 associated with the piston 4 and the open/close element 5 forms a sealed volume comprising an orifice 6 connected to the inflation pipe 7. This inflation pipe 7 extends as far as a space accessible to an operator who can connect a compressor to inflate the assembled unit. Opposite the orifice 6 there is also an orifice 8 whose function is to conduct the inflation air to the assembled unit.

When the purging device is attached directly to the rim of the assembled unit, this orifice 8 is directly connected to the inflation hole provided in the rim. In other embodiments it may be desired not to connect the purging device to the rim. The orifice 8 is then connected to the inflation hole of the rim via a pipe (not shown in the figures) whose cross section must be greater than or equal to the purging cross section of the purging device 1.

The piston 4 and the open/close element 5 are connected to each other and are movable inside the cavity 3 without allowing leakage from the cavity, since the piston 4 and the open/close valve 5 have seals. The open/close element 5 is thus movable between a closed position as shown in FIG. 1a and a purging position as shown in FIG. 1b.

FIG. 1b shows the purging device 1 in its purging position. The open/close element 5 moved away from its position in FIG. 1a is in a position such that it offers an opening by offering a passage for the inflation air to the orifice 9 located in the body 2 of the purging device 1.

The purging device 1 also has a pipe 10 connected to a cavity 11 situated in the body 2 and closed by the piston 4. This pipe 10 is for conducting compressed air for acting on the piston 4 to operate the open/close element 5 towards its open or purging position.

The purging device 1 also has a spring 12 compressed between on the one hand a bearing surface on a wall of the body 2 and a bearing surface on the open/close element 5. The compression and stiffness of the spring are predetermined so that the open/close element 5 is normally closed as shown in FIG. 1a, while FIG. 1b shows the purging device 1 in an open condition.

When an assembled unit fitted with the purging device 1 is to be inflated, compressed air is sent along the pipe 7 and through the cavity 3 from the orifice 6 to the orifice 8 to reach the assembled unit. In the case of FIGS. 1a, 1b, the surface area of the piston 4 exposed to the inflation air and the surface area of the open/close element 5 exposed to the inflation air are equal. Whatever the pressure of the inflation air is, it does not cause any movement of the assembly composed of the piston 4 and open/close element 5. As explained earlier, it is the spring 12 that closes the open/close element 5.

In FIG. 1b the open position of the open/close element 5 is obtained by sending compressed air into the cavity 11 via the pipe 10. This air exerts a force on that surface of the piston 4 which is not in contact with the inflation air.

The force exerted by this compressed air must be sufficient to compress the spring 12 so that the assembly composed of the piston 4 and open/close element 5 can be moved. The properties of the spring, especially its stiffness, are therefore defined so as to allow the purging device 1 to be opened without the need for overly complex tools.

When the piston 4 of the purging device 1 is moved and the open/close element 5 reaches its open position, an annular opening is created around the open/close element 5 which releases the inflation air. This inflation air is then discharged through the orifice 9 formed in the body 2 of the purging device 1.

Figure 2:
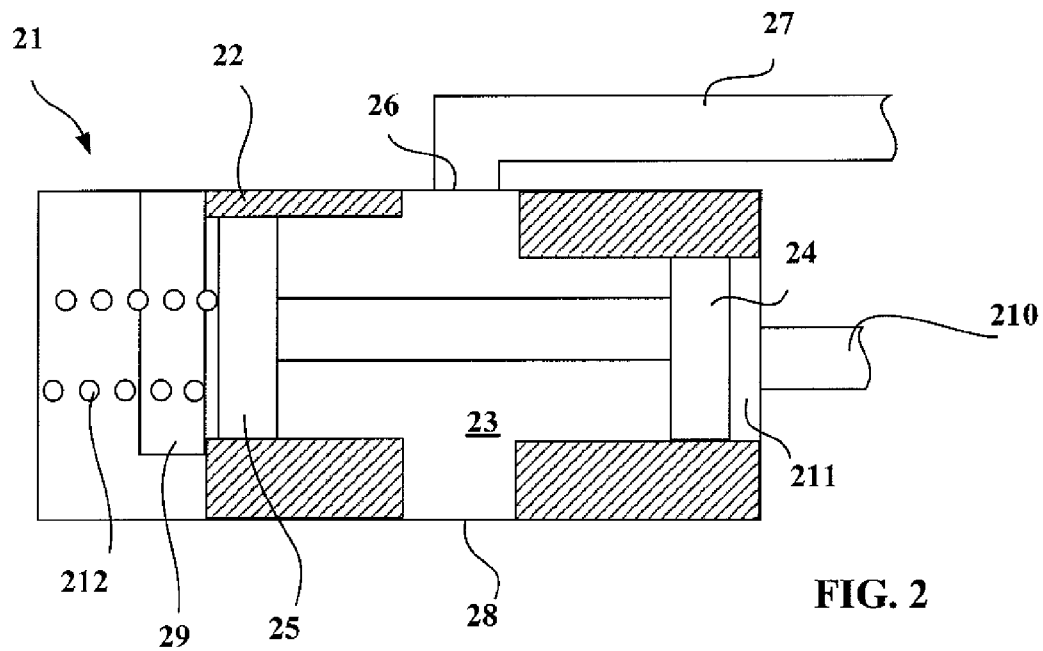

FIG. 2 illustrates a purging device 21 with a passive control system that opens the open/close element 25 as soon as a predefined threshold pressure is reached in the assembled unit. The pressure in the assembled unit can be increased by, among other things, an increase in the temperature of the inflation air caused for example by the tire or by the brake systems. It is preferable to avoid this type of pressure increase, particularly to preserve the integrity of the tire.

In the case of FIG. 2, the design of the purging device 21 is such that the surface area of the piston 24 in contact with the inflation air is less than the surface area of the open/close element 25 in contact with the inflation air. The open/close element 25 is kept in the closed position, as in the case of FIG. 1, by the presence of a spring 212 whose properties, particularly stiffness, are defined, in the case of FIG. 2, to compensate for the force resulting from the pressure of the inflation air acting on the surface area equal to the difference between the surface area of the open/close element 25 and that of the piston 24. Since this force is proportional to the inflation pressure, the properties of the spring can be selected to correspond to a given pressure of the assembled unit, termed the "threshold pressure". This means that above this threshold pressure the spring is under compression and the open/close element 25 is moved to a purging position. As soon as the pressure falls back below this threshold pressure, the spring returns the open/close element 25 to its normal closed position.

Figure 3:
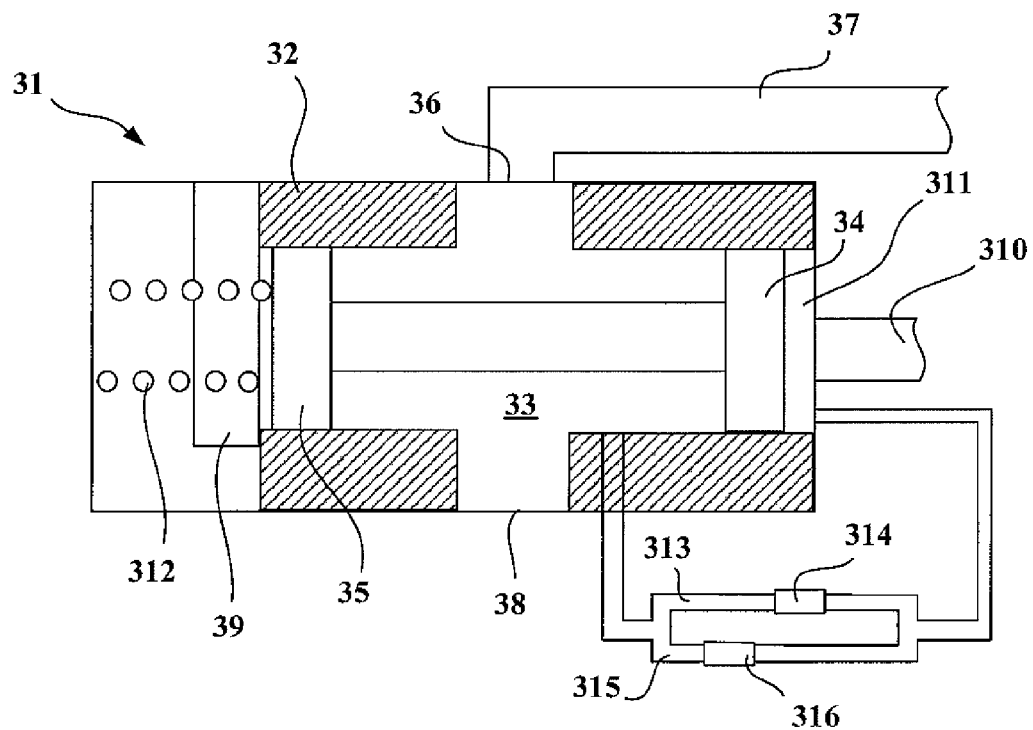

FIG. 3 also illustrates a purging device 31 comprising a passive control system and also comprising an active control system.

The purging device 31 is similar to that shown in FIG. 1 and additionally comprises a supplementary pipe 313 connecting the cavity 33 of the body 32 to the cavity 311 defined by that surface of the piston 34 which is not in contact with the inflation air. This pipe 313 comprises a device 314 that closes the air passage and is able to open as soon as the predetermined threshold pressure is reached; such a component may for example be a diaphragm valve designed to rupture at the predetermined pressure threshold. The combination of the pipe 313 and the device 314 constitutes a passive control system that limits the risks associated with pressure increases in the assembled unit.

In the case of FIG. 3, the choice as to the size and stiffness of the spring 312 will define the final pressure of the assembled unit as soon as the threshold pressure is reached, because it is the pressure of the assembled unit that will exert the operating force on the piston 34. One choice is for example to reach a pressure of two bar which will allow the vehicle to return unladen and at a slow speed to a workshop either for repair or to restore this passive control system, for example by replacing the diaphragm valve.

The purging device 31 also comprises another supplementary pipe 315 connecting the cavity 33 of the body 32 to the cavity 311 defined by that surface of the piston 34 which is not in contact with the inflation air. This pipe 315 is connected to a command 316 controlled by an operator from the vehicle cab or situated alongside the vehicle, which command opens the pipe 315 and therefore opens the open/close element 35, and therefore deflates the assembled unit. This method of deflation, controlled because the operator starts and stops it at will, constitutes an active control system. It may also be fitted with a system for purging the pipe 315 which is actuated during the stoppage to return the cavity 311 to atmospheric pressure.

The pipes 313 and 315 advantageously comprise non-return open/close elements or equivalent devices for preventing the passage of air conducted by the pipe 310. in the same way the pipe 310 may comprise a non-return open/close element for preventing the passage of air conducted by the pipes 313 and 315.

Opening the purging device 1, 21, 31, whether as shown in FIG. 1, 2 or 3, leads to the creation of an annular orifice at the end of the cavity 3, 23, 33 inside the body 2, 22, 32. This annular orifice is designed to offer the air an outlet area great enough to considerably reduce deflation times compared with current methods while locally limiting the size of the orifice in order to limit the passage of solid particles from inside the assembled unit and which could become projectiles carried by the stream of deflating air.

The purging device according to the invention further has the advantage of being easily adaptable to existing wheels and easily fitted in general. In addition, the purging device can be designed easily so that the internal parts are easily removable for maintenance, and in particular independently of tire removal. One advantage of this is that it is important to be able to clean it regularly because said purging device according to the invention can capture particles to prevent them being hurled out of the cavity of the assembled unit.

Deflation tests have been performed on assembled units with tires of sizes 59/80R63 and 44/80R57. The tests were performed on assembled tires fitted with a purging valve according to the invention.

Other tests have been performed on these same assembled units with deflation performed in the usual way through an inflation valve.

The results obtained are given in the following table:

|  | 59/80R63 | 44/80R57 |
|---|---|---|
| Deflation by purging device according to the invention | 3.20 min | 2 min |
| Deflation by inflation valve | 42 min | 28 min |

These results also show the advantages in terms of simplicity and safety that the deflation times obtained according to the invention are far shorter than the usual times and can lead to considerable gains in terms of productivity of the vehicles.

The purging device according to the invention is particularly advantageous for large assembled units for civil engineering type applications. The device can also be used for any type of assembled unit such as assembled units for heavy vehicles, especially those designed to be fitted to single-wheel vehicles in replacement for twinned-wheel vehicles, assembled units for agricultural-type vehicles, especially those of large dimensions inflated at low pressures, etc.

The invention claimed is:

1. A purging device for an assembled unit for a vehicle, the assembled unit having both a wheel comprising a rim and a tire, said purging device comprising:
   a body connected to an inflation tube of the assembled unit, said body being adapted to be subjected to inflation pressure of the assembled unit applied by inflation air received inside the body from the inflation tube, and
   a piston configured to move inside the body,
   said piston operating an open/close element, fixed to the piston, between a closed position and a purging position of the body,
   said open/close element being normally closed,
   wherein the open/close element and the piston each have a face configured to be exposed to the inflation air inside the body in the closed position, and
   wherein the open/close element is opened by action of an operating force on the piston.

2. The purging device according to claim 1, wherein the operating force is provided by compressed air directed onto that surface of the piston which is not configured to be in contact with the inflation air in the closed position.

3. The purging device according to claim 1, wherein in its open position the purging device has at least one discharge orifice.

4. The purging device according to claim 3, wherein the discharge orifice has at least one characteristic dimension that is less than 10 mm.

5. The purging device according to claim 1, comprising a control system for moving the piston to the purging position as soon as the tire pressure exceeds a threshold pressure.

6. The purging device according to claim 5, comprising a compressible means providing the normally closed position, and a passive-type control system, wherein the tire pressure keeps the open/close element open until a pressure defined by the compressible means is reached.

7. The purging device according to claim 6, wherein the passive control system is provided by the fact that the cross section of the piston face designed to be exposed to the inflation air is smaller than the cross section of the open/close element face designed to be exposed to the inflation air.

8. The purging device according to claim 5, comprising an active-type control system and wherein the tire inflation pressure keeps the open/close element open by means of an operator command.

9. The purging device according to claim 1 for an assembled unit for a dumper-type vehicle.

10. A method of deflating an assembled unit, having both a wheel comprising a rim and a tire for a vehicle, using a purging device, wherein said purging device comprises a body connected to an inflation tube of the assembled unit, a piston configured to move inside the body, and an open/close element, fixed to the piston, the method comprising:
    (a) subjecting said body to inflation pressure of the assembled unit applied by inflation air received inside the body from the inflation tube; and
    (b) in response to the inflation pressure, operating said piston so as to operate the open/close element between a closed position and a purging position of the body, said open/close element normally being in the closed position, wherein the open/close element and the piston each have a face exposed to the inflation air inside the body in the closed position, and wherein the open/close element is opened by action of an operating force on the piston during said operating step (b).

\* \* \* \* \*